US011595957B2

United States Patent
Zhu et al.

(10) Patent No.: US 11,595,957 B2
(45) Date of Patent: Feb. 28, 2023

(54) TECHNIQUES FOR PARALLEL SEARCH AND MEASUREMENT IN WIRELESS COMMUNICATIONS

(71) Applicant: QUALCOMM Incorporated, San Diego, CA (US)

(72) Inventors: Jun Zhu, San Diego, CA (US); Kang Gao, San Diego, CA (US); Yong Li, San Diego, CA (US); Heechoon Lee, San Diego, CA (US); Arvind Vardarajan Santhanam, San Diego, CA (US); Peter Pui Lok Ang, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 17/244,416

(22) Filed: Apr. 29, 2021

(65) Prior Publication Data
US 2022/0353863 A1 Nov. 3, 2022

(51) Int. Cl.
*H04L 12/28* (2006.01)
*H04W 72/0453* (2023.01)
*H04J 1/16* (2006.01)

(52) U.S. Cl.
CPC .............. *H04W 72/0453* (2013.01)

(58) Field of Classification Search
CPC ... H04J 11/0073; H04L 5/0023; H04W 56/00; H04W 72/0453
USPC ................. 370/252, 329, 430, 503
See application file for complete search history.

(56) References Cited

U.S. PATENT DOCUMENTS

| 2019/0044639 A1* | 2/2019 | Ouchi | H04W 52/18 |
| 2020/0029302 A1* | 1/2020 | Cox | H04W 52/0229 |
| 2021/0076391 A1* | 3/2021 | Davydov | H04L 5/0091 |
| 2022/0256634 A1* | 8/2022 | Kim | H04W 76/19 |

FOREIGN PATENT DOCUMENTS

| WO | WO-2010105148 A1 | 9/2010 |
| WO | WO-2021021784 A1 | 2/2021 |
| WO | WO-2021042365 A1 | 3/2021 |

OTHER PUBLICATIONS

International Search Report and Written Opinion—PCT/US2022/022794—ISA/EPO—Jun. 29, 2022.
(Continued)

*Primary Examiner* — John Pezzlo
(74) *Attorney, Agent, or Firm* — Dalei Dong; Holland & Hart LLP

(57) ABSTRACT

Methods, systems, and devices for wireless communications are described. In a wireless communications system, a user equipment (UE) may receive, from a base station, an indication of a set of component carriers (CCs) for the UE and a respective frequency range (FR) for each CC of the set of CCs. Each CC-FR pairing may be associated with a respective priority of a set of priorities. The UE may initiate a plurality of timers, where each timer of the plurality of timers may correspond to a respective CC-FR pairing. After expiration of a timer of the plurality of timers, the UE may measure one or more reference signals of a subset of the set of CCs based at least in part on a capability of the UE and a priority of the respective CC-FR pairing associated with the timer.

30 Claims, 13 Drawing Sheets

(56) References Cited

OTHER PUBLICATIONS

Sharma D. P., et al., "Distributed and Prioritised Scheduling to Implement Carrier Aggregation in LTE Advanced Systems", 2014 Fourth International Conference on Advanced Computing & Communication Technologies, IEEE, Feb. 8, 2014 (Feb. 8, 2014), pp. 390-393, XP032584803, DOI:10.1109/ACCT.2014.71, [retrieved on Apr. 3, 2014] p. 392-p. 393.

* cited by examiner

TECHNIQUES FOR PARALLEL SEARCH AND MEASUREMENT IN WIRELESS COMMUNICATIONS

FIELD OF DISCLOSURE

The following relates, for example, to wireless communications, including techniques for parallel search and measurement (SAM) in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support devices performing search and measurement (SAM) processes, which may aid in beam management or beam adaptation for such devices. It some cases, however, a device may have limited capability for performing a given number of SAM processes.

SUMMARY

The described techniques relate to improved methods, systems, devices, and apparatuses that support techniques for parallel search and measurement (SAM) in wireless communications. For example, the described techniques provide for a user equipment (UE) to determine component carriers (CCs) to measure as part of a SAM process based on a capability of the UE, timers associated with each pair of a CC and a corresponding frequency range (FR) (e.g., CC-FR pairing), and priorities associated with each CC-FR pairing. In some cases, the UE may be configured (e.g., by a base station) for an operating mode that supports multiple CCs in different FRs. For example, the UE may be configured with a set of CC-FR pairs, where each pair has a respective priority. The UE may initiate and maintain a set of timers for the configured CC-FR pairs. The timers may indicate the time remaining until the next SAM window for a corresponding CC-FR pair. In some cases, the time remaining may be defined by a periodicity associated with a given CC-FR pair, which may be preconfigured for the UE. If SAM is to be performed by the UE, the UE may determine which of the timers have expired and in cases where the number of CC-FR pairs corresponding to the expired timers exceed the capability of the UE (e.g., the number of CC-FR pairs exceed the number of radio frequency chains of the UE), in which case the UE may select a subset of the configured CC-FR pairs to measure based on the respective priority level of the CC-FR pairs.

A method for wireless communications at a user equipment (UE) is described. The method may include receiving, from a base station, an indication of a set of CCs for the UE and a respective FR for each CC of the set of CCs, where each CC-FR pairing is associated with a respective priority of a set of priorities, initiating a set of multiple timers, where each timer of the set of multiple timers corresponds to a respective CC-FR pairing, and measuring, after expiration of a timer of the set of multiple timers, one or more reference signals of a subset of the set of CCs based on a capability of the UE and a priority of the respective CC-FR pairing associated with the timer.

An apparatus for wireless communications at a UE is described. The apparatus may include a processor, memory coupled with the processor, and instructions stored in the memory. The instructions may be executable by the processor to cause the apparatus to receive, from a base station, an indication of a set of CCs for the UE and a respective FR for each CC of the set of CCs, where each CC-FR pairing is associated with a respective priority of a set of priorities, initiate a set of multiple timers, where each timer of the set of multiple timers corresponds to a respective CC-FR pairing, and measure, after expiration of a timer of the set of multiple timers, one or more reference signals of a subset of the set of CCs based on a capability of the UE and a priority of the respective CC-FR pairing associated with the timer.

Another apparatus for wireless communications at a UE is described. The apparatus may include means for receiving, from a base station, an indication of a set of CCs for the UE and a respective FR for each CC of the set of CCs, where each CC-FR pairing is associated with a respective priority of a set of priorities, means for initiating a set of multiple timers, where each timer of the set of multiple timers corresponds to a respective C-FR pairing, and means for measuring, after expiration of a timer of the set of multiple timers, one or more reference signals of a subset of the set of CCs based on a capability of the UE and a priority of the respective CC-FR pairing associated with the timer.

A non-transitory computer-readable medium storing code for wireless communications at a UE is described. The code may include instructions executable by a processor to receive, from a base station, an indication of a set of CCs for the UE and a respective FR for each CC of the set of CCs, where each CC-FR pairing is associated with a respective priority of a set of priorities, initiate a set of multiple timers, where each timer of the set of multiple timers corresponds to a respective CC-FR pairing, and measure, after expiration of a timer of the set of multiple timers, one or more reference signals of a subset of the set of CCs based on a capability of the UE and a priority of the respective CC-FR pairing associated with the timer.

Some examples of the method, apparatuses, and non-transitory computer-readable medium described herein may further include operations, features, means, or instructions for selecting the subset of the set of CCs for measuring based on the set of priorities, where a number of CCs of the selected subset of the set of CCs may be less than or equal to a number of radio frequency chains capable of being performed by the UE based on the capability of the UE.

Some examples of the method, apparatuses, and non-transitory computer-readable medium described herein may further include operations, features, means, or instructions for determining a priority of the set of priorities for each of the selected subset of the set of CCs based on a priority table, where the priority table indicates respective priorities for each CC-FR pairing, and where the selected subset of the set of CCs may be selected based on the determining.

Some examples of the method, apparatuses, and non-transitory computer-readable medium described herein may further include operations, features, means, or instructions for refraining from measuring a second subset of the set of CCs based on the set of priorities, where each CC of the second subset may be different from CCs in the selected subset.

In some examples of the method, apparatuses, and non-transitory computer-readable medium described herein, refraining from measuring the second subset of the set of CCs may include operations, features, means, or instructions for refraining from measuring the second subset of the set of CCs based on each CC of the second subset having active timers or having a respective priority below a priority threshold.

In some examples of the method, apparatuses, and non-transitory computer-readable medium described herein, the priority threshold corresponds to the number of radio frequency chains of the UE based on the capability of the UE.

In some examples of the method, apparatuses, and non-transitory computer-readable medium described herein, the set of multiple timers includes a respective timer for each CC-FR pairing.

Some examples of the method, apparatuses, and non-transitory computer-readable medium described herein may further include operations, features, means, or instructions for determining a measurement timing for each CC-FR pairing, where each timer of the set of multiple timers corresponds to a respective measurement timing.

In some examples of the method, apparatuses, and non-transitory computer-readable medium described herein, each CC-FR pairing may be associated with a first measurement timing corresponding to a connected discontinuous reception mode (CDRX) mode of the UE and a second measurement timing corresponding to an idle or inactive DRX mode of the UE.

In some examples of the method, apparatuses, and non-transitory computer-readable medium described herein, measuring the one or more reference signals may include operations, features, means, or instructions for measuring the one or more reference signals for each receive beam of a set of receive beams of the UE.

In some examples of the method, apparatuses, and non-transitory computer-readable medium described herein, measuring the one or more reference signals may include operations, features, means, or instructions for measuring the one or more reference signals over a set of resources allocated for the reference signals, the set of resources allocated based on one or more FRs associated with the one or more reference signals.

Some examples of the method, apparatuses, and non-transitory computer-readable medium described herein may further include operations, features, means, or instructions for transmitting an indication of the capability of the UE that indicates a number of radio frequency chains of the UE.

Some examples of the method, apparatuses, and non-transitory computer-readable medium described herein may further include operations, features, means, or instructions for receiving a message instructing the UE to operate in a first operating mode of a set of operating modes, where the first operating mode supports the set of CCs for the UE.

Some examples of the method, apparatuses, and non-transitory computer-readable medium described herein may further include operations, features, means, or instructions for determining a duration for each timer of the set of multiple timers based on a UE mode, where the UE mode includes one of a normal mode or a panic mode.

In some examples of the method, apparatuses, and non-transitory computer-readable medium described herein, the one or more reference signals of the subset of the set of CCs may be measured as a part of a SAM process for the UE.

In some examples of the method, apparatuses, and non-transitory computer- readable medium described herein, one or more CCs of the set of CCs includes a narrowband (NB) CC.

DETAILED DESCRIPTION

A wireless communications system may support carrier aggregation (CA) or other operations for a device using multiple component carriers (CCs). In some cases, a user equipment (UE) may perform search and measurement (SAM) processes on cells or CCs to aid in beam management and adaptation. The UE may be capable of supporting a number of radio frequency chains (e.g., SAM chains), which specify the number of different CCs that the UE may be capable of measuring at one time during a SAM process. In cases where the UE is configured by the network to support multiple CCs in different frequency ranges (FRs), such as when the UE may be configured for CA envelope expansions, FR2 inter-band CA, or other operating modes, the UE may be configured with a number of CCs for measuring that exceeds the measurement capability of the UE (e.g., the number of configured CCs may exceed the number of radio frequency chains of the UE). As such, the UE may not be capable of measuring all of the configured CCs for the UE.

Techniques described herein support a UE determining which CCs to measure based on a capability of the UE, timers associated with each pair of a CC and a respective FR (e.g., CC-FR pairing), and priorities associated with each CC-FR pairing. In some cases, the UE may be configured (e.g., by a base station) for an operating mode that supports multiple CCs in different FRs. For example, the UE may be configured with a set of CC-FR pairs, where each pair has a respective priority. The UE may initiate and maintain a set of timers, where each timer may correspond to a CC-FR pair. The timers may specify the time remaining until the next SAM window for a corresponding CC-FR pair. In some cases, the time remaining may be defined by a periodicity standard or specification, which may be preconfigured for the UE by the base station. If SAM is to be performed by the UE, the UE may determine which of the timers have expired. In some cases, the number of CC-FR pairs corresponding to the expired timers may exceed the capability of the UE (e.g., may exceed the number of radio frequency chains of the UE), in which case the UE may select a subset of the configured CC-FR pairs to measure based on the respective priority level of the CC-FR pairs.

Aspects of the disclosure are initially described in the context of wireless communications systems. Aspects of the disclosure are further illustrated by and described with reference to a timeline and a process flow. Aspects of the disclosure are further illustrated by and described with reference to apparatus diagrams, system diagrams, and flowcharts that relate to techniques for parallel SAM in wireless communications.

Figure 1:
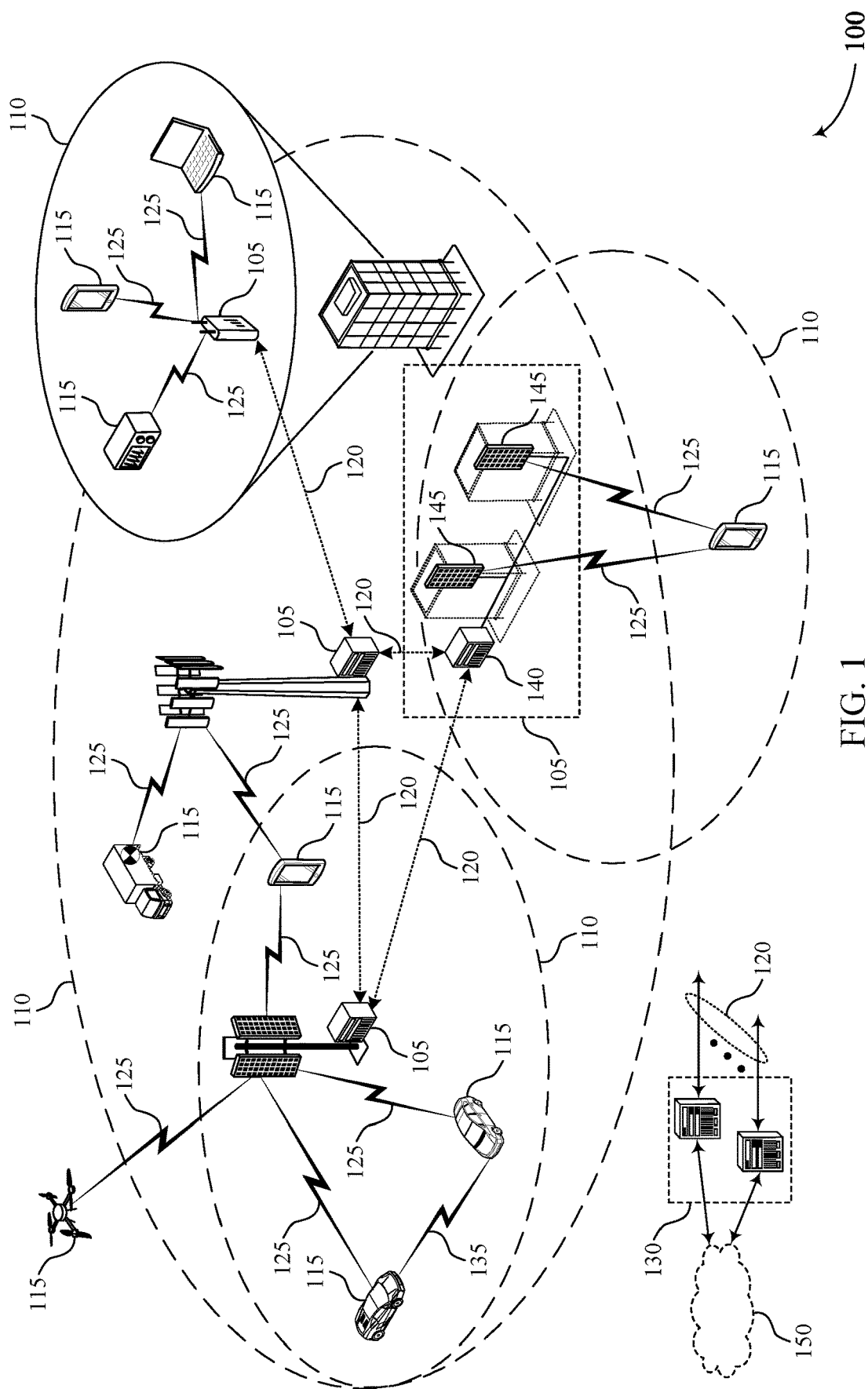
FIG. 1 illustrates an example of a wireless communications system that supports techniques for parallel search and measurement (SAM) in wireless communications in accordance with various aspects of the present disclosure.

FIG. 1 illustrates an example of a wireless communications system 100 that supports techniques for parallel SAM in wireless communications in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using CA or multi-carrier operation. A UE 115 may be configured with multiple downlink CCs and one or more uplink CCs according to a CA configuration. CA may be used with both frequency division duplexing (FDD) and time division duplexing (TDD) CCs.

In some examples (e.g., in a CA configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell, for example, covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband (NB) IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to NB communications), or a combination of these techniques. For example, some UEs 115 may be configured for operation using an NB protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a CA configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to aspects herein, the UE 115 may determine which CCs to measure based on a capability of the UE 115, timers associated with each pair of a CC and a respective FR (e.g., CC-FR pairing), and priorities associated with each CC-FR pairing. In some cases, the UE 115 may be configured (e.g., by the base station 105) for an operating mode that supports multiple CCs in different FRs. For example, the UE 115 may be configured with a set of CC-FR pairs, where each pair has a respective priority. The UE 115 may initiate and maintain a set of timers, where each timer may correspond to a CC-FR pair. The timers may specify the time remaining until the next SAM window for a corresponding CC-FR pair. In some cases, the time remaining may be defined by a periodicity associated with the CC-FR pair, the operating mode of the UE, or other factors. In some cases, the UE 115 may be configured with a duration for each of the timers or may be preconfigured for the UE 115 in accordance with a set of operating standards. If SAM is to be performed by the UE 115, the UE 115 may determine which of the timers have expired. In some cases, the number of CC-FR pairs corresponding to the expired timers may exceed the capability of the UE 115 (e.g., may exceed the number of radio frequency chains of the UE 115), in which case the UE 115 may select a subset of the configured CC-FR pairs to measure based on the respective priority level of the CC-FR pairs.

Figure 2:
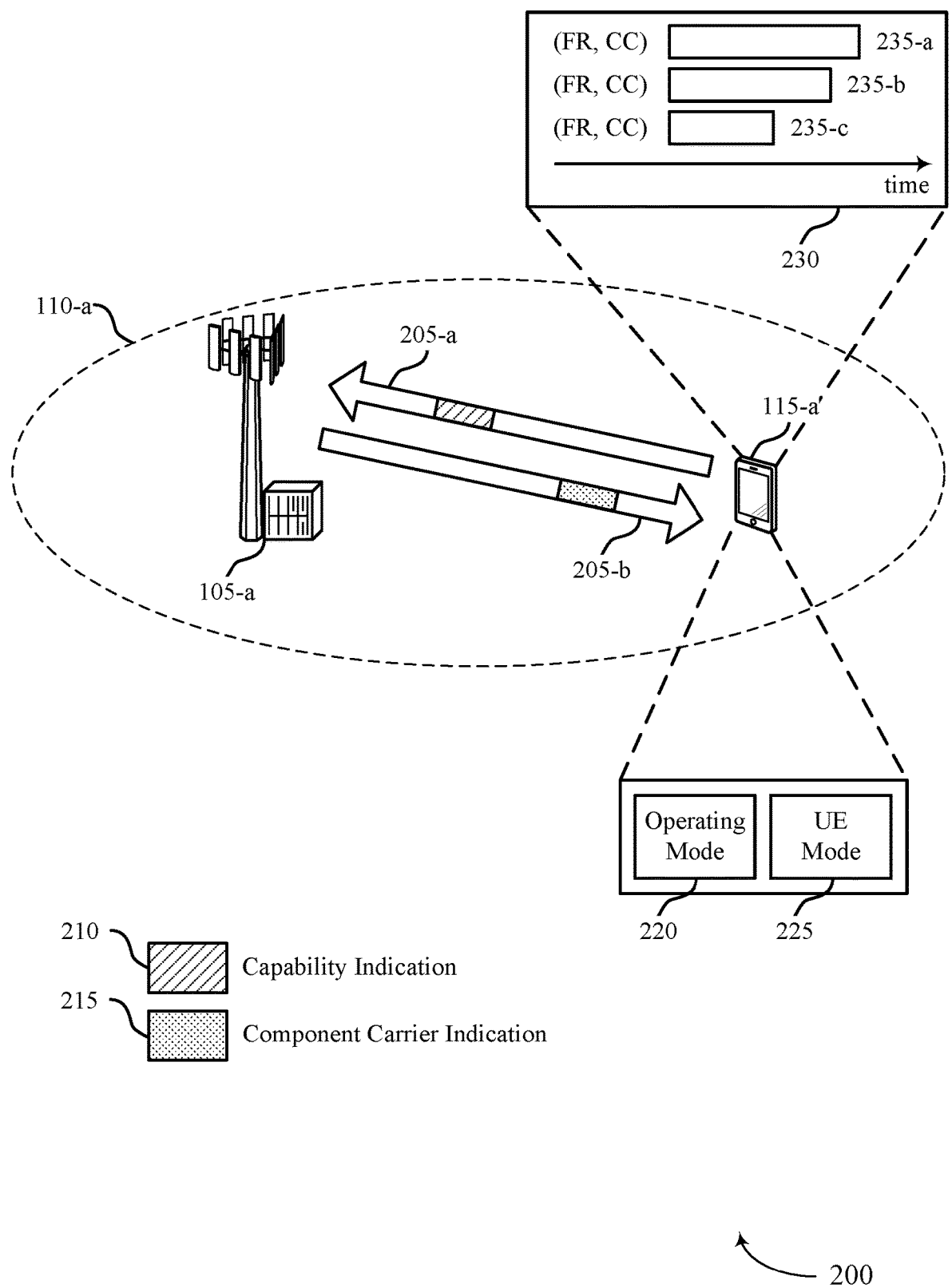
FIG. 2 illustrates an example of a wireless communications system that supports techniques for parallel SAM in wireless communications in accordance with various aspects of the present disclosure.

FIG. 2 illustrates an example of a wireless communications system 200 that supports techniques for parallel SAM in wireless communications in accordance with various aspects of the present disclosure. In some examples, wireless communications system 200 may implement or be implemented by aspects of wireless communications system 100. For example, the wireless communications system 200 may include a UE 115-a and a base station 105-a, which may be examples of a UE 115 and a base station 105 as described with reference to FIG. 1.

In some cases, the UE 115-a may support a number of parallel NB radio frequency chains (e.g., SAM chains). The number of radio frequency chains the UE 115-a may support may be the minimum number between M and N (e.g., min(M,N)), where M may be an integer value (e.g., a value of 4 by default on all targets), and N may be the number of configured CCs and the number of gapless measurement objects (MOs) (e.g., the scheduled resources during an inter-frequency SAM process) in total. In some examples, the number of configured CCs or the number of gapless MOs may be configured by the network (e.g., the base station 105-a). In some cases, M may be consistent as the envelope or power mode (e.g., the operating mode) of the UE 115-a changes. For example, while M might be a value of 4 in some cases, M may be reduce to 2 or 3 in some other operating modes (e.g., a low power mode). The UE 115-a, however, may be incapable of accommodating such a change. In some cases, M may represent the number of radio frequency chains the UE 115-a may support (e.g., a UE capability).

Using some techniques, for a given M, the UE 115-a may be able to measure M number of configured CCs during a SAM process (e.g., if N exceeds M). In cases where N is larger than M, the UE 115-a may benefit from techniques to allocate or share parallel NB radio frequency chains for different operating modes of the UE 115-a. In some cases, the UE 115-a may be capable of supporting multiple operating modes configured by the base station 105-a. The various operating modes may include CA envelope expansion, FR2 inter-band CA, FR1+FR2 dual connectivity (DC)/CA, and 5G+5G multiple subscriber identity module (MSIM), among other modes. In some cases, the UE 115-a may support more potential gapless use cases such as inter-frequency within a BWP, FR1 to FR2 inter-frequency, among others.

The UE 115-a may communicate with the base station 105-a in a geographic coverage area 110-a supported by the base station 105-a. For example, the base station 105-a may transmit one or more downlink signals to the UE 115-a via a communications link 205-a (e.g., a downlink communications link) and the UE 115-a may transmit one or more uplink signals to the base station 105-a via a communications link 205-b (e.g., an uplink communications link). In some cases, the UE 115-a may transmit a capability indication 210 to the base station via the communications link 205-a. The capability indication 210 may indicate the capability of the UE 115-a, which may include or specify a number of radio frequency chains the UE 115-a may be capable of supporting (e.g., M radio frequency chains).

In some examples, the base station 105-a may transmit a CC indication 215 via the communications link 205-b, which may indicate a set of CCs for the UE 115-a. For example, the CC indication 215 may indicate a set of CCs and a respective FR for each CC as CC-FR pairs (also referred to herein as FR-CC pairs) configured or available for use by the UE. Each CC-FR pair may be associated with a respective priority of a set of priorities. In some cases, the base station 105-a may configure the UE 115-a with an operating mode 220 and a number of CCs. For example, for FR2 intra-band CA, the base station 105-a may configure the UE 115-a with a number of CCs all in the same frequency band (FR1, FR2, FR3, etc.). For an FR2 inter-band operating mode 220, the base station 105-a may configure the UE 115-a with 8 CCs that may have a dynamic configuration (e.g., 2 CCs per band, 4 CCs per band, and so on). As such, the number of CCs and the operating mode 220 the base station 105-a may configure for the UE 115-a may be independent of one another.

In some examples, the UE 115-a (e.g., or an NB manager of the UE 115-a) may coordinate between a SAM scheduler on FR1 and FR2 to dynamically allocate NB resources as demanded by the UE 115-a. In some cases, the UE 115-a may maintain a set of timers 230 for the CC-FR pairs performing SAM (e.g., each (FR, CC, SAM), where FR may be FR1 or FR2, and SAM may represent SAM being performed on that FR-CC pair). The UE 115-a may record the remaining time until a next scheduling signal, such as a synchronization signal block (SSB) or an SSB measurement time configuration (SMTC), is received by the UE 115-a for each FR-CC pair performing SAM. In other words, the timer may run until a next SAM window is available for the UE 115-a. In some cases, the remaining time may be based on a periodicity as shown in and described with reference to Table 1. In some cases, the periodicities as shown in Table 1 may be determined (e.g., based on a set of operating standards) for the UE 115-a, and may be based on the FR (e.g., FR1, FR2) and the type of CC (e.g., primary CC (PCC), secondary CC (SCC)).

TABLE 1

|  | SAM Periodicity | |
| --- | --- | --- |
| (FR, CC) | Non-CDRX | CDRX |
| FR2 PCC | 160 ms per Rx | 6 CDRX per Rx |
| FR2 act SCC | 160 * # SCC ms per Rx | 6 CDRX * # SCC per Rx |
| FR2 de-act SCC | 960 * # SCC ms per Rx | 36 CDRX * # SCC perRx |
| FR1 PCC | 600 ms | 6 CDRX |
| FR1 act SCC | 600 * # of SCC ms | 6 CDRX * # SCC |
| FR1 de-act SCC | 3600 * # of SCC ms | 36 CDRX * # SCC |

Table 1 provides an example of SAM periodicity as described herein. In some cases, the periodicity may be specified for each FR-CC pair and for a respective connected discontinuous reception (CDRX) mode and a respective non-CDRX mode (e.g., an idle or inactive mode) of the UE 115-a. For example, for the FR-CC pair FR2-PCC, the periodicity may be 160 ms per reception beam (Rx) for the non-CDRX mode and 6 CDRX per Rx for the CDRX mode. In an example for the FR-CC pair FR1-PCC, the periodicity may be 600 ms for the non-CDRX mode and 6 CDRX for the CDRX mode. The periodicities for FR2 activated (e.g., act)-SCC pairs, FR2 de-activated (e.g., de-act)-SCC pairs, FR1-act SCC pairs, and FR1-de-act SCC pairs are also shown in Table 1. In some examples, periodicities for FR-CC pairs may include examples not shown in Table 1.

In some cases, the UE 115-a may maintain the set of timers 230 that may include timers of different durations (e.g., based on different periodicities for each FR-CC pair corresponding to one of the timers). For example, the UE 115-a may maintain a timer 235-a for an FR-CC pair, a timer 235-b for a different FR-CC pair, and a timer 235-c for a different FR-CC pair, where the timer 235-a may have a longer duration than the timer 235-b, and the timer 235-b may have a longer duration than the timer 235-c. In some cases, the UE 115-a may maintain as many timers 235 as there are configured CC-FR pairs (e.g., as many as N timers).

In some cases, if N is greater than M (e.g., the number of scheduled resources during an inter-frequency SAM process is greater than the UE capability), the UE 115-a may select a top M expired FR-CC pair for SAM to schedule. For example, for the timer for the FR-CC pair FR2-PCC may expire after 160 ms based on the periodicity as shown in and described with reference to Table 1. If multiple FR-CC pair timers expire at the same time, the FR-CC pairs with the highest priorities may be prioritized and scheduled (e.g., the top M FR-CC pair), and the remaining N–M requests may be rejected by the UE 115-a. In some cases, priorities of each FR-CC pair may be based on the priority table as shown in and described with reference to Table 2. In some cases, the priority table may be configured for the UE 115-a per the UE design or may otherwise be configured for the UE 115-a.

TABLE 2

| (FR, CC) | Priority |
|---|---|
| FR2 PCC | 0 |
| FR1 PCC | 1 |
| FR1 act SCC | 2 |
| FR2 act SCC | 3 |
| FR1 de-act SCC | 4 |
| FR2 de-act SCC | 5 |

Table 2 provides an example of priorities for different FR-CC pairs as described herein. In Table 2, a smaller number may indicate a higher priority. For example, the FR-CC pair FR2-PCC may have the highest priority 0, the FR-CC pair FR1-PCC may have the next highest priority 1, and so on. As such, if all of the timers corresponding to all of the FR-CC pairs in Table 2 expired at the same time, the UE 115-a may follow the priority table as shown in Table 2 to schedule the corresponding resources. In some cases, PCCs may have a higher priority than activated (e.g., act) SCCs, which may have a higher priority than de-activated (e.g., de-act) SCCs regardless of the FR (e.g., FR2 or FR1).

In some cases, the UE 115-a may be configured with a UE mode 225 which may be a panic mode or a normal mode. For example, the periodicity (e.g., how long the UE 115-a may perform SAM) as shown in and described with reference to Table 1 may be used for the UE 115-a in a normal UE mode 225. In some cases, the UE 115-a may operate in a panic UE mode 225 if there is a low SNR and therefore SAM may be performed more frequently than in a normal UE mode 225. The UE 115-a may define different periodicities in a panic mode than those shown in Table 1, which may be associated with a normal UE mode 225.

In some cases, the UE 115-a may be capable of handling different scenarios as configured by the base station 105-a, such as synchronized and asynchronized signal transmissions, arbitrary SSB and SMTC periodicities and offsets, and CDRX configurations. In some cases, after performing SAM on the selected CC-FR pairs, the UE 115-a may transmit a reference signal received power (RSRP), an SNR, or other metric to be used for beam selection, link adaptation, and other procedures between the UE 115-a and the base station 105-a. In some cases, the described techniques may save power for the UE 115-a by waking up at most once per CDRX cycle, which may reduce the power used by the UE 115-a. In some examples, such techniques may reduce the current used by the UE 115-a from 64 milliamps (mA) to 56 mA.

Figure 3:
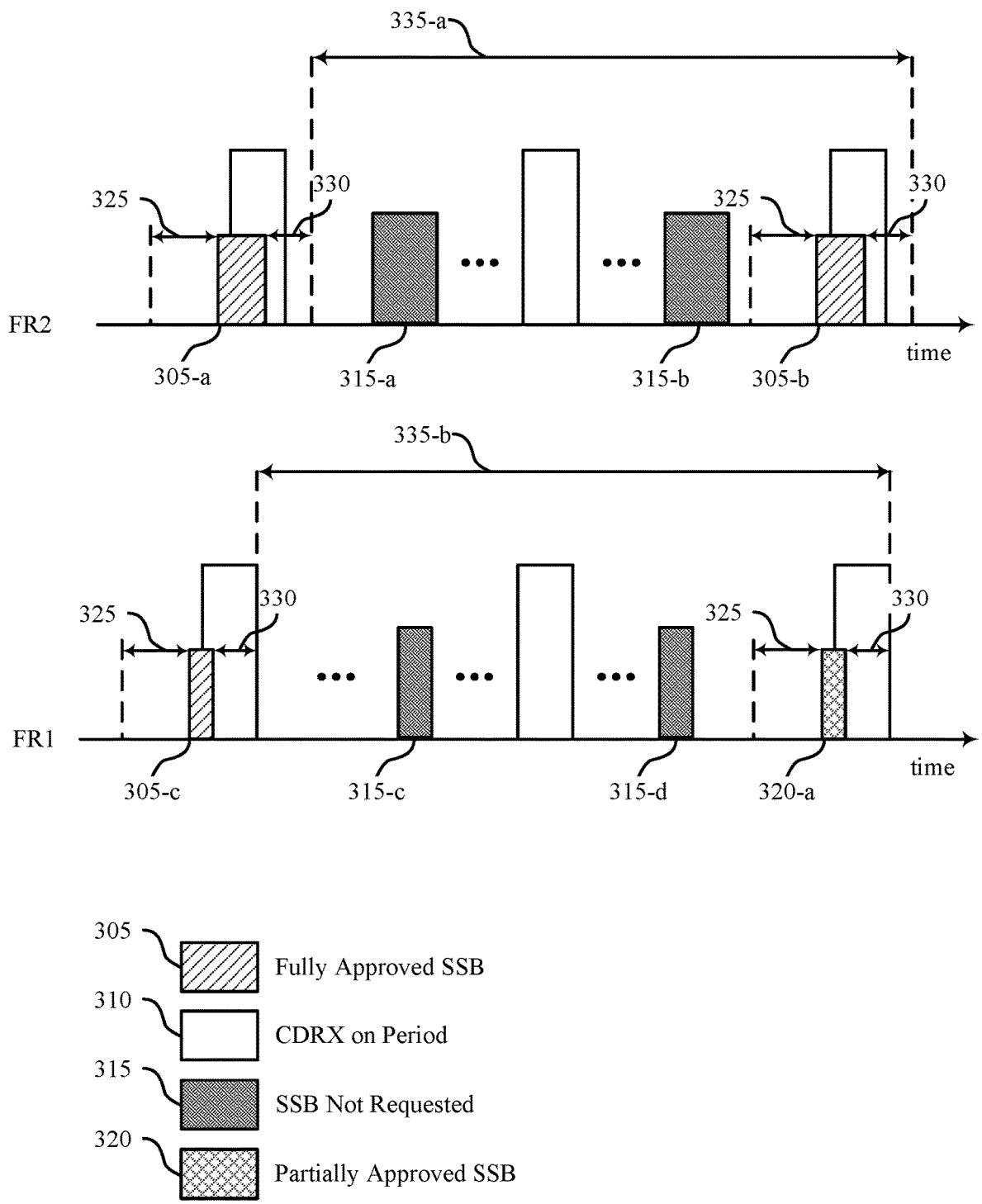
FIG. 3 illustrates an example of a timeline that supports techniques for parallel SAM in wireless communications in accordance with various aspects of the present disclosure.

FIG. 3 illustrates an example of a timeline 300 that supports techniques for parallel SAM in wireless communications in accordance with various aspects of the present disclosure. In some examples, the timeline 300 may implement or be implemented by aspects of wireless communications systems 100 and 200, for example a UE 115-a and a base station 105-a as described with reference to FIGS. 1 and 2.

In some cases, the timeline 300 may include a timeline for FR2 and FR1. In some cases, for example, the FR2 timeline may represent inter-band CA and may include 2 bands, each with 1 PCC (e.g., the FR2 timeline may include 2 CCs), and the FR1 timeline may include 1 PCC plus 2 SCCs. As such, the UE 115-a may have 5 total configured CCs to schedule. Using the techniques as described herein, the UE 115-a may schedule SAM for the CCs following the timeline 300.

In some examples, the UE 115-a may have a capability to support 4 radio frequency chains (e.g., M=4) and may be configured with the 5 total CCs. The UE 115-a may receive a request for SAM on the 5 CCs (e.g., a SAM scheduler may request the UE 115-a to perform SAM). In some cases, during the request period, the UE 115-a may receive an SSB 305-a on FR2 and an SSB 305-c on FR1 such that the SSBs 305 do not collide (e.g., do not overlap in time). This may allow the UE 115-a to schedule the 3 CCs (e.g., 1 PCC and 2 SCCs) on FR1 and the 2 PCCs on FR2) sequentially. As such, the SSB 305-a and the SSB 305-c may be fully approved SSBs 305. In some cases, the SSB 305-a and the SSB 305-c may both have a pre-process time 325 of 4 ms and a post-process time 330 of 2 ms. In some cases, the UE 115-a may receive the SSB 305-a and the SSB 305-c during a CDRX on period 310 (e.g., enabled DRX mode).

In some cases, the UE 115-a may receive an SSB 315-a and an SSB 315-b on FR2 and an SSB 315-c and an SSB 315-d on FR1. The UE 115-a may receive the SSBs 315 outside of a CDRX on period 310 and in between requests for SAM. For example, the UE 115-a may receive the SSB 315-a and the SSB 315-b during the period 335-a on FR2 and the SSB 315-c and the SSB 315-c during the period 335-b on FR1, where the periods 335 may be between requests for SAM activity.

In some examples, the UE 115-a may receive a request for SAM after the periods 335. In some cases, during the request period, the UE 115-a may receive an SSB 305-b on FR2 and an SSB 320-a on FR1 such that the SSBs 305 collide (e.g., overlap in time). In some cases, the SSB 305-b and the SSB 320-a may both have a pre-process time 325 of 4 ms and a post-process time 330 of 2 ms. In some cases, the UE 115-a may receive the SSB 305-b and the SSB 320-a in a CDRX on period 310 (e.g., enabled DRX mode). Because of the collision and the UE capability (e.g., the UE 115-a having 4 radio frequency chains and being configured with 5 CCs), the UE 115-a may lack the capability to measure all 5 CCs at the same time. As such, the UE 115-a may prioritize 4 CCs to measure based on its capability of M=4. Based on the priority table as shown in Table 2 as described with reference to FIG. 2, the UE 115-a may prioritize and schedule one or more FR-CC pairs. For example, the UE 115-a may prioritize FR-CC pairs with FR2 over FR1, and with PCCs over SCCs. As such, the SSB 305-b may be fully approved by the UE 115-a and the 2 PCCs in FR2 may be scheduled (e.g., an FR2-PCC pair) while the SSB 320-a may be partially approved (e.g., a partially approved SSB 320) such that the 1 PCC and 1 SCC in FR1 may be scheduled (e.g., an FR1-PCC pair and an FR1-SCC pair), while the remaining SCC may be rejected.

Figure 4:
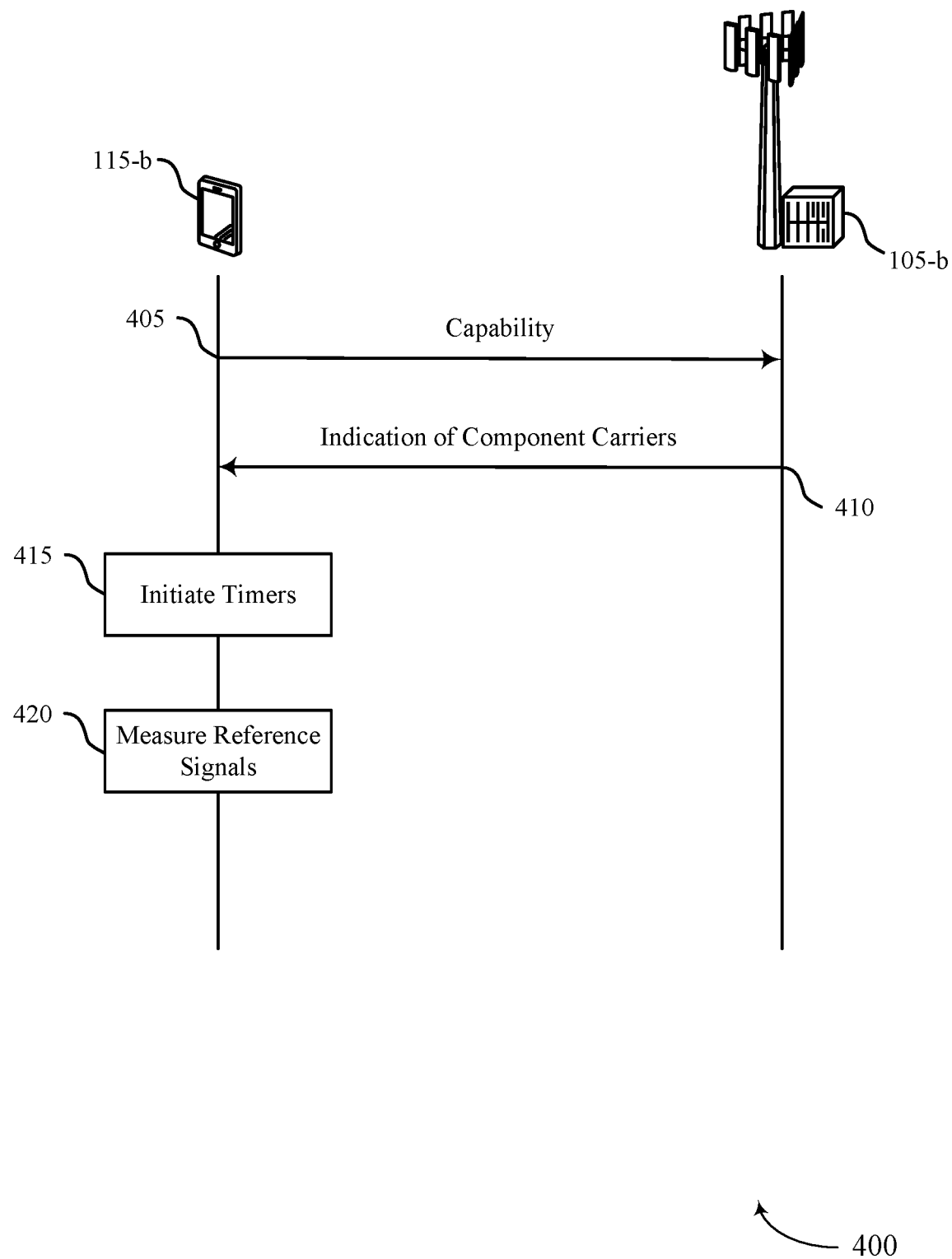
FIG. 4 illustrates an example of a process flow that supports techniques for parallel SAM in wireless communications in accordance with various aspects of the present disclosure.

FIG. 4 illustrates an example of a process flow 400 that supports techniques for parallel SAM in wireless communications in accordance with various aspects of the present disclosure. The process flow 400 may implement or be implemented by aspects of wireless communications system 100. For example, the process flow 400 may include a UE 115-b and a base station 105-b, which may be examples of a UE 115 and a base station 105, as described with reference to FIGS. 1 and 2. In the following description of the process flow 400, the operations between the UE 115-b and the base station 105-b may be transmitted in a different order than the example order shown, or the operations performed by the UE 115-b and the base station 105-b may be performed in different orders or at different times. Some operations may also be omitted from the process flow 400, and other operations may be added to the process flow 400.

At 405, the UE 115-b may transmit, to the base station 105-b, an indication of the UE capability that indicates a number of radio frequency chains (e.g., SAM chains) of the UE 115-b. In some cases, the UE 115-b may be capable of supporting M number of radio frequency chains. In some examples, the base station 105-b may configure the UE 115-b with an operating mode such as CA envelope expansion, FR2 inter-band CA, FR1+FR2 DC/CA, and 5G+5G MSIM, among other modes.

At 410, the UE 115-b may receive, from the base station 105-b, an indication of a set of CCs for the UE and a respective FR for each CC of the set of CCs (e.g., a set of CC-FR pairs). In some cases, each CC-FR pairing may be associated with a respective priority of a set of priorities. In some cases, the UE 115-b may be configured with more CC-FR pairs than the number of radio frequency chains it may support (e.g., N may be greater than M), and as such may use the techniques described herein to select which CC-FR pairs to measure in a SAM process.

At 415, the UE 115-b may initiate a plurality of timers, where each timer corresponds to a respective CC-FR pairing. In some cases, each timer may have a different duration based on a different periodicity for each CC-FR pairing corresponding to the timer. The periodicities may depend on the FR (e.g., FR1, FR2), the type of CC (e.g., PCC, activated SCC, de-activated SCC), and on the UE 115-b being in a CDRX mode or a non-CDRX mode.

At 420, the UE 115-b may measure, after the expiration of a timer of the plurality of timers, one or more reference signals of a subset of the set of CCs based on the UE capability and a priority of the respective CC-FR pairing associated with the timer. In some cases, the U 115-d may configure the priority levels where, for example, FR2 may have a higher priority than FR1, and PCCs may have a higher priority than SCCs. In some cases, the remaining N–M requests may be rejected by the UE 115-b (e.g., the UE 115-b may refrain from measuring the remaining N–M requests).

Figure 5:
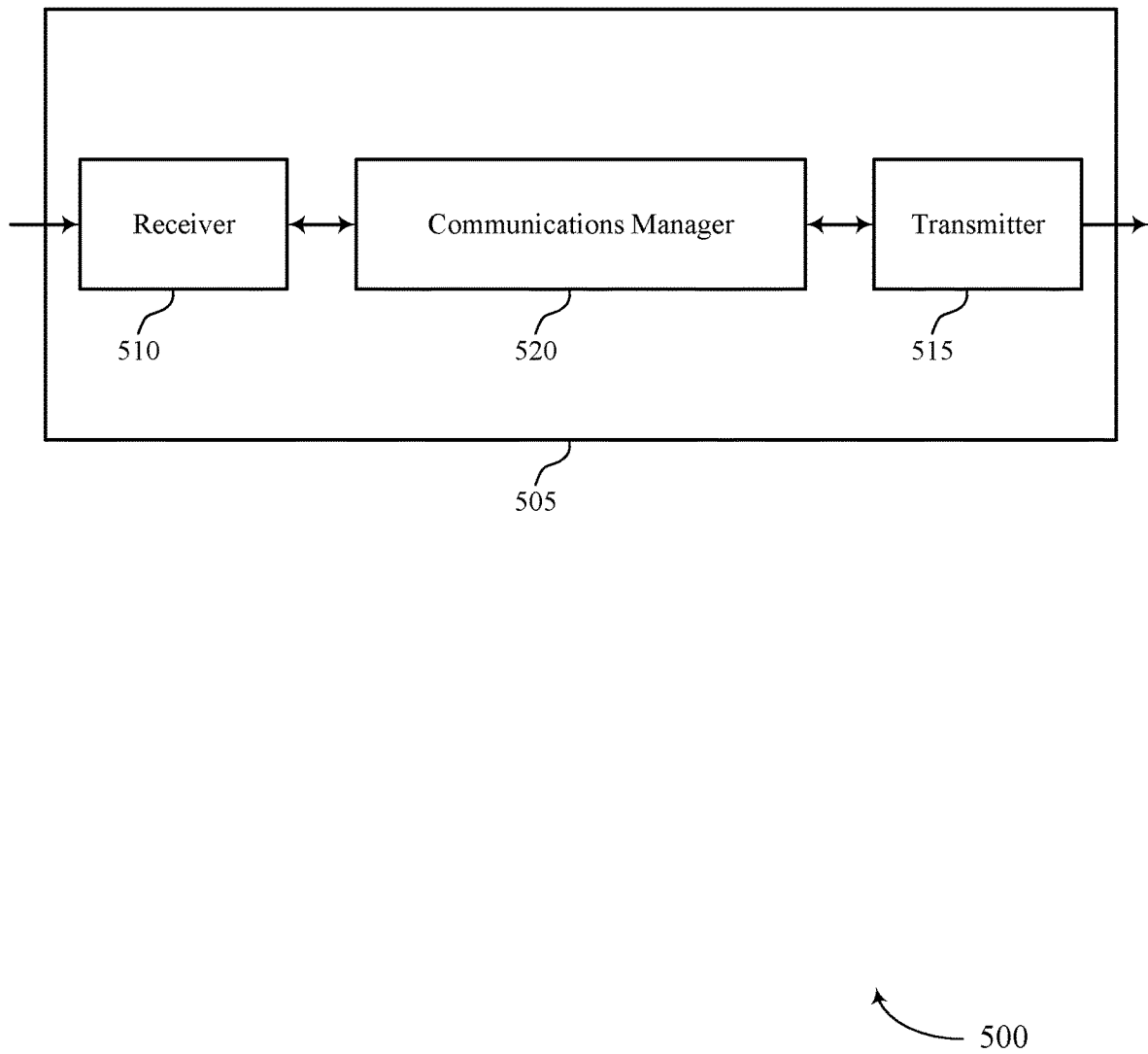
FIGS. 5 and 6 show block diagrams of devices that support techniques for parallel SAM in wireless communications in accordance with various aspects of the present disclosure.

FIG. 5 shows a block diagram 500 of a device 505 that supports techniques for parallel SAM in wireless communications in accordance with various aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for parallel SAM in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for parallel SAM in wireless communications). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for parallel SAM in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, an indication of a set of CCs for the UE and a respective FR for each CC of the set of CCs, where each CC-FR pairing is associated with a respective priority of a set of priorities. The communications manager 520 may be configured as or otherwise support a means for initiating a set of multiple timers, where each timer of the set of multiple timers corresponds to a respective CC-FR pairing. The communications manager 520 may be configured as or otherwise support a means for measuring, after expiration of a timer of the set of multiple timers, one or more reference signals of a subset of the set of CCs based on a capability of the UE and a priority of the respective CC-FR pairing associated with the timer.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for parallel SAM in wireless communications which may increase efficiency and reduce power consumption, among other advantages for the device 505. As such, supported techniques may include improved network operations and, in some examples, may promote network efficiencies, among other benefits.

Figure 6:
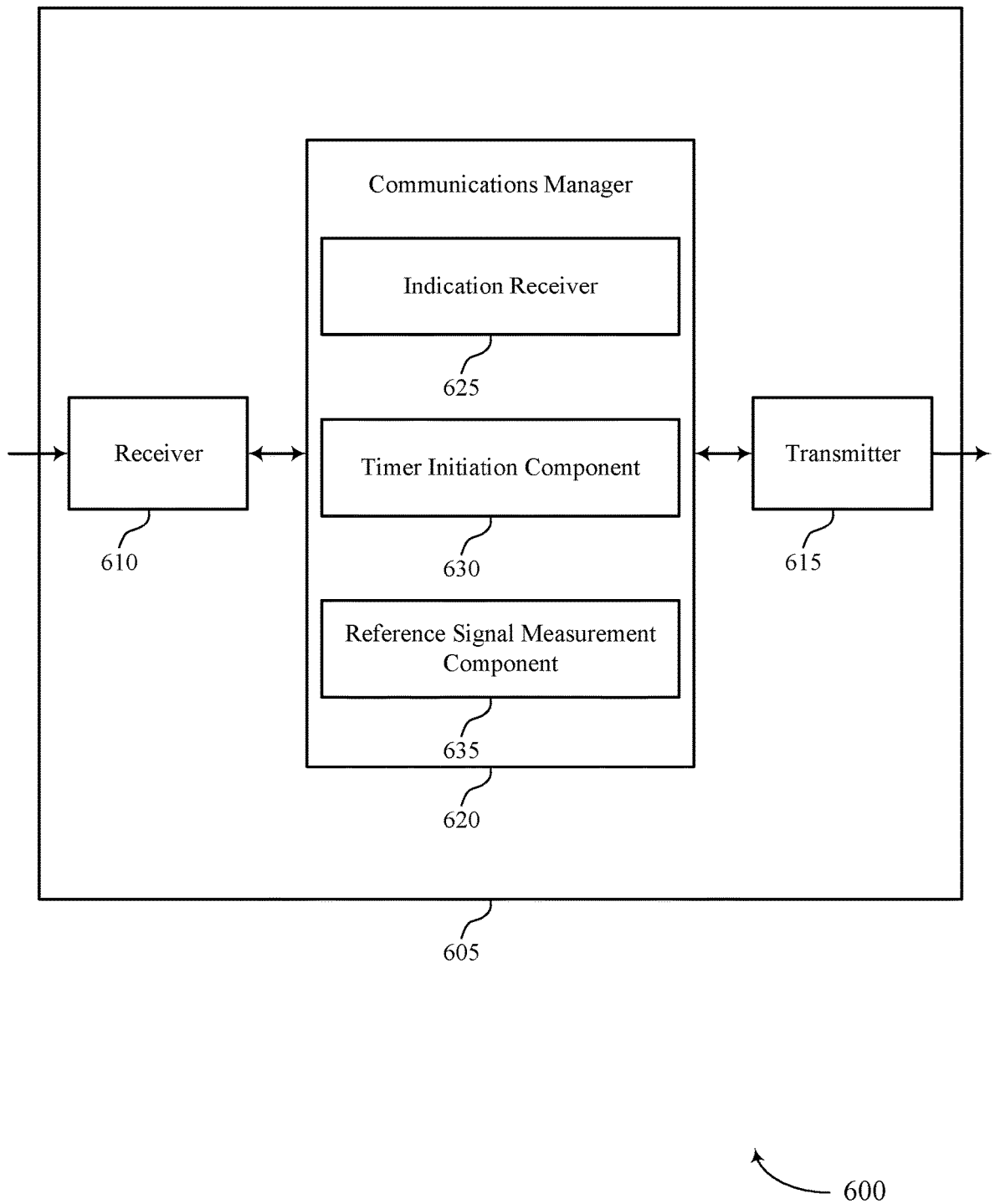

FIG. 6 shows a block diagram 600 of a device 605 that supports techniques for parallel SAM in wireless communications in accordance with various aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for parallel SAM in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for parallel SAM in wireless communications). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for parallel SAM in wireless communications as described herein. For example, the communications manager 620 may include an indication receiver 625, a timer initiation component 630, a reference signal measurement component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The indication receiver 625 may be configured as or otherwise support a means for receiving, from a base station, an indication of a set of CCs for the UE and a respective FR for each CC of the set of CCs, where each CC-FR pairing is associated with a respective priority of a set of priorities. The timer initiation component 630 may be configured as or otherwise support a means for initiating a set of multiple timers, where each timer of the set of multiple timers corresponds to a respective CC-FR pairing. The reference signal measurement component 635 may be configured as or otherwise support a means for measuring, after expiration of a timer of the set of multiple timers, one or more reference signals of a subset of the set of CCs based on a capability of the UE and a priority of the respective CC-FR pairing associated with the timer.

Figure 7:
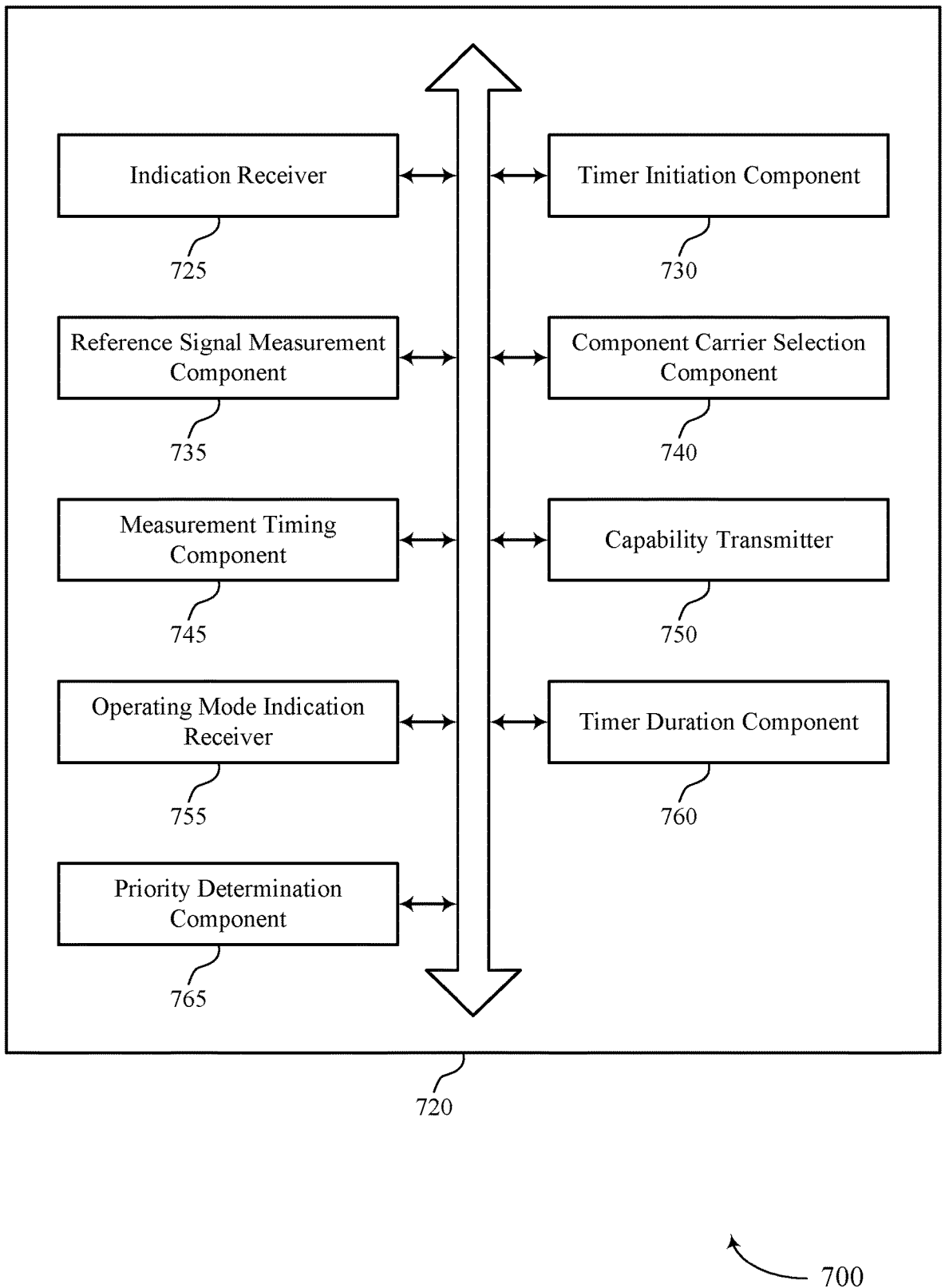
FIG. 7 shows a block diagram of a communications manager that supports techniques for parallel SAM in wireless communications in accordance with various aspects of the present disclosure.

FIG. 7 shows a block diagram 700 of a communications manager 720 that supports techniques for parallel SAM in wireless communications in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for parallel SAM in wireless communications as described herein. For example, the communications manager 720 may include an indication receiver 725, a timer initiation component 730, a reference signal measurement component 735, a CC selection component 740, a measurement timing component 745, a capability transmitter 750, an operating mode indication receiver 755, a timer duration component 760, a priority determination component 765, or any combination thereof. Each of these components may communicate, directly or indirectly, with one another (e.g., via one or more buses).

The communications manager 720 may support wireless communications at a UE in accordance with examples as disclosed herein. The indication receiver 725 may be configured as or otherwise support a means for receiving, from a base station, an indication of a set of CCs for the UE and a respective FR for each CC of the set of CCs, where each CC-FR pairing is associated with a respective priority of a set of priorities. The timer initiation component 730 may be configured as or otherwise support a means for initiating a set of multiple timers, where each timer of the set of multiple timers corresponds to a respective CC-FR pairing. The reference signal measurement component 735 may be configured as or otherwise support a means for measuring, after expiration of a timer of the set of multiple timers, one or more reference signals of a subset of the set of CCs based on a capability of the UE and a priority of the respective CC-FR pairing associated with the timer.

In some examples, the CC selection component 740 may be configured as or otherwise support a means for selecting the subset of the set of CCs for measuring based on the set of priorities, where a number of CCs of the selected subset of the set of CCs is less than or equal to a number of radio frequency chains capable of being performed by the UE based on the capability of the UE.

In some examples, the priority determination component 765 may be configured as or otherwise support a means for determining a priority of the set of priorities for each of the selected subset of the set of CCs based on a priority table, where the priority table indicates respective priorities for each CC-FR pairing, and where the selected subset of the set of CCs is selected based on the determining.

In some examples, the reference signal measurement component 735 may be configured as or otherwise support a means for refraining from measuring a second subset of the set of CCs based on the set of priorities, where each CC of the second subset is different from CCs in the selected subset.

In some examples, to support refraining from measuring the second subset of the set of CCs, the reference signal measurement component 735 may be configured as or otherwise support a means for refraining from measuring the second subset of the set of CCs based on each CC of the second subset having active timers or having a respective priority below a priority threshold.

In some examples, the priority threshold corresponds to the number of radio frequency chains of the UE based on the capability of the UE.

In some examples, the set of multiple timers includes a respective timer for each CC-FR pairing.

In some examples, the measurement timing component 745 may be configured as or otherwise support a means for determining a measurement timing for each CC-FR pairing, where each timer of the set of multiple timers corresponds to a respective measurement timing.

In some examples, each CC-FR pairing is associated with a first measurement timing corresponding to a CDRX mode of the UE and a second measurement timing corresponding to an idle or inactive DRX mode of the UE.

In some examples, to support measuring the one or more reference signals, the reference signal measurement component 735 may be configured as or otherwise support a means for measuring the one or more reference signals for each receive beam of a set of receive beams of the UE.

In some examples, to support measuring the one or more reference signals, the reference signal measurement component 735 may be configured as or otherwise support a means for measuring the one or more reference signals over a set of resources allocated for the reference signals, the set of resources allocated based on one or more FRs associated with the one or more reference signals.

In some examples, the capability transmitter 750 may be configured as or otherwise support a means for transmitting an indication of the capability of the UE that indicates a number of radio frequency chains of the UE.

In some examples, the operating mode indication receiver 755 may be configured as or otherwise support a means for receiving a message instructing the UE to operate in a first operating mode of a set of operating modes, where the first operating mode supports the set of CCs for the UE.

In some examples, the timer duration component 760 may be configured as or otherwise support a means for determining a duration for each timer of the set of multiple timers based on a UE mode, where the UE mode includes one of a normal mode or a panic mode.

In some examples, the one or more reference signals of the subset of the set of CCs are measured as a part of a SAM process for the UE. In some examples, one or more CCs of the set of CCs includes an NB CC.

Figure 8:
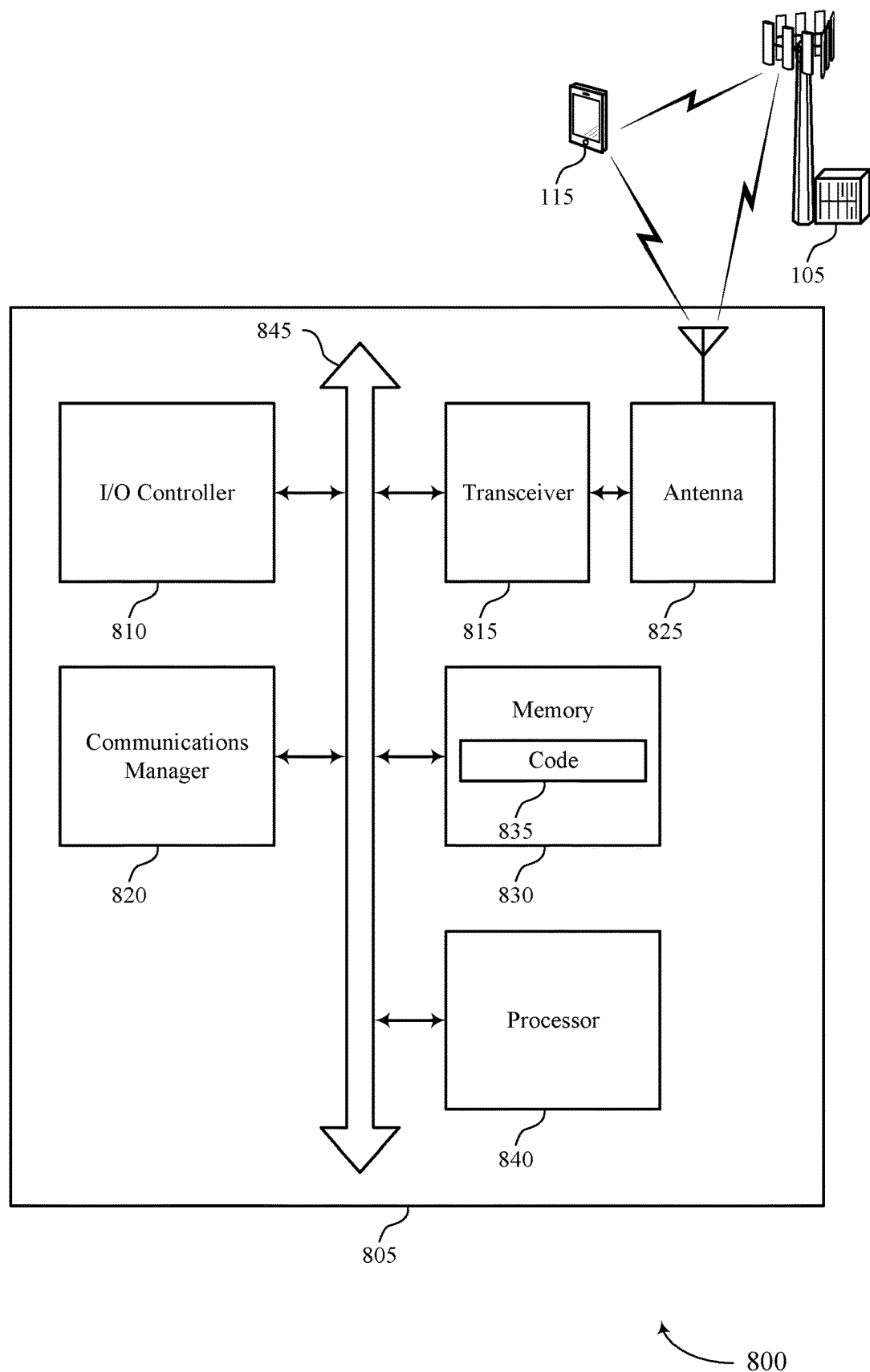
FIG. 8 shows a diagram of a system including a device that supports techniques for parallel SAM in wireless communications in accordance with various aspects of the present disclosure.

FIG. 8 shows a diagram of a system 800 including a device 805 that supports techniques for parallel SAM in wireless communications in accordance with various aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/I controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for parallel SAM in wireless communications). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, an indication of a set of CCs for the UE and a respective FR for each CC of the set of CCs, where each CC-FR pairing is associated with a respective priority of a set of priorities. The communications manager 820 may be configured as or otherwise support a means for initiating a set of multiple timers, where each timer of the set of multiple timers corresponds to a respective CC-FR pairing. The communications manager 820 may be configured as or otherwise support a means for measuring, after expiration of a timer of the set of multiple timers, one or more reference signals of a subset of the set of CCs based on a capability of the UE and a priority of the respective CC-FR pairing associated with the timer.

By including or configuring the communications manager 820 in accordance with examples as described herein, the device 805 may support techniques for parallel SAM in wireless communications which may increase efficiency and reduce power consumption, among other advantages. As such, supported techniques may include improved network operations and, in some examples, may promote network efficiencies, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for parallel SAM in wireless communications as described herein, or the processor 840 and the memory 830 may be otherwise configured to perform or support such operations.

Figure 9:
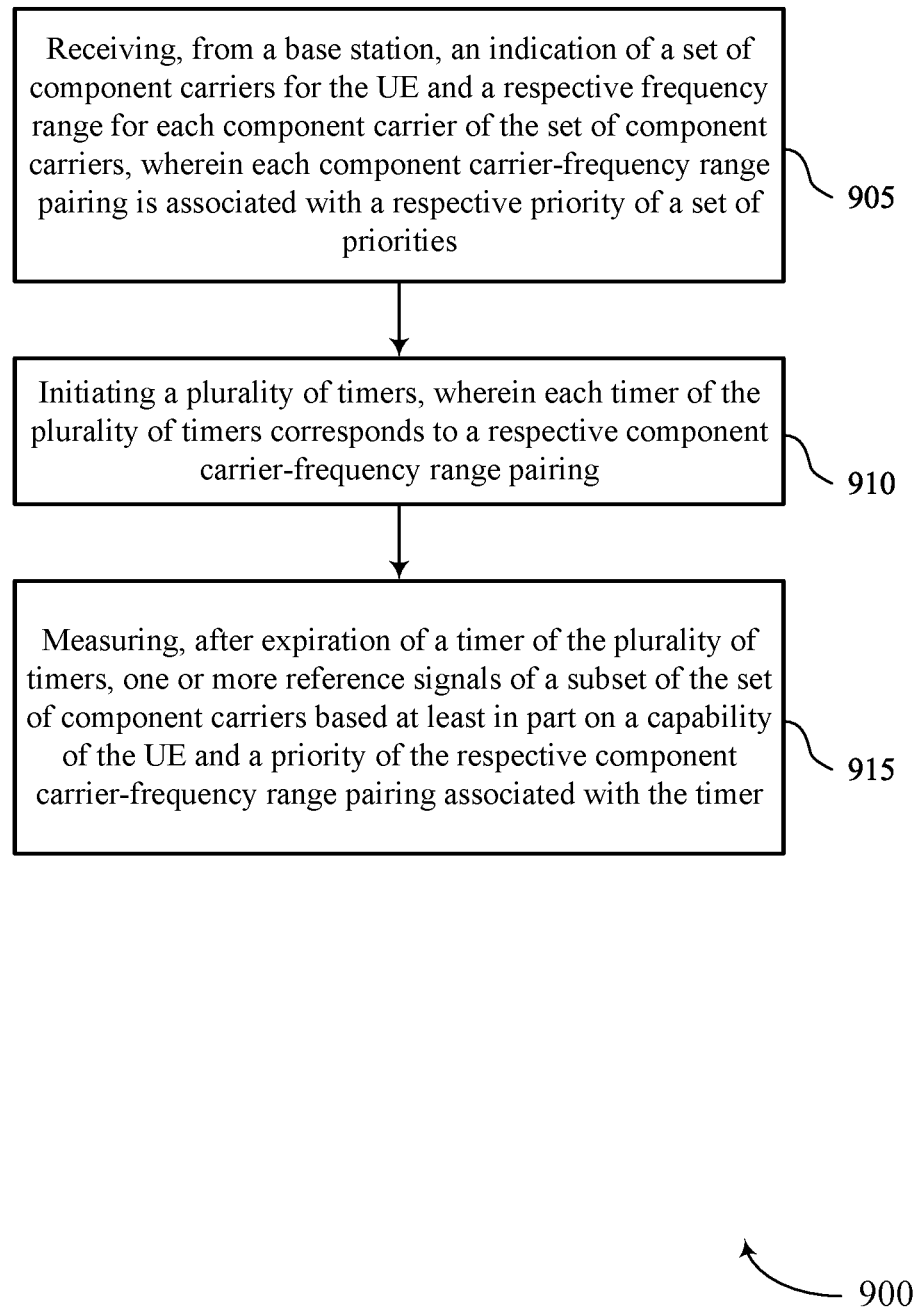
FIGS. 9 through 13 show flowcharts illustrating methods that support techniques for parallel SAM in wireless communications in accordance with various aspects of the present disclosure.

FIG. 9 shows a flowchart illustrating a method 900 that supports techniques for parallel SAM in wireless communications in accordance with various aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a base station, an indication of a set of CCs for the UE and a respective FR for each CC of the set of CCs, where each CC-FR pairing is associated with a respective priority of a set of priorities. The operations of 905 may be performed in accordance with examples as disclosed herein. In some examples, aspects of the operations of 905 may be performed by an indication receiver 725 as described with reference to FIG. 7.

At 910, the method may include initiating a set of multiple timers, where each timer of the set of multiple timers corresponds to a respective CC-FR pairing. The operations of 910 may be performed in accordance with examples as disclosed herein. In some examples, aspects of the operations of 910 may be performed by a timer initiation component 730 as described with reference to FIG. 7.

At 915, the method may include measuring, after expiration of a timer of the set of multiple timers, one or more reference signals of a subset of the set of CCs based on a capability of the UE and a priority of the respective CC-FR pairing associated with the timer. The operations of 915 may be performed in accordance with examples as disclosed herein. In some examples, aspects of the operations of 915 may be performed by a reference signal measurement component 735 as described with reference to FIG. 7.

Figure 10:
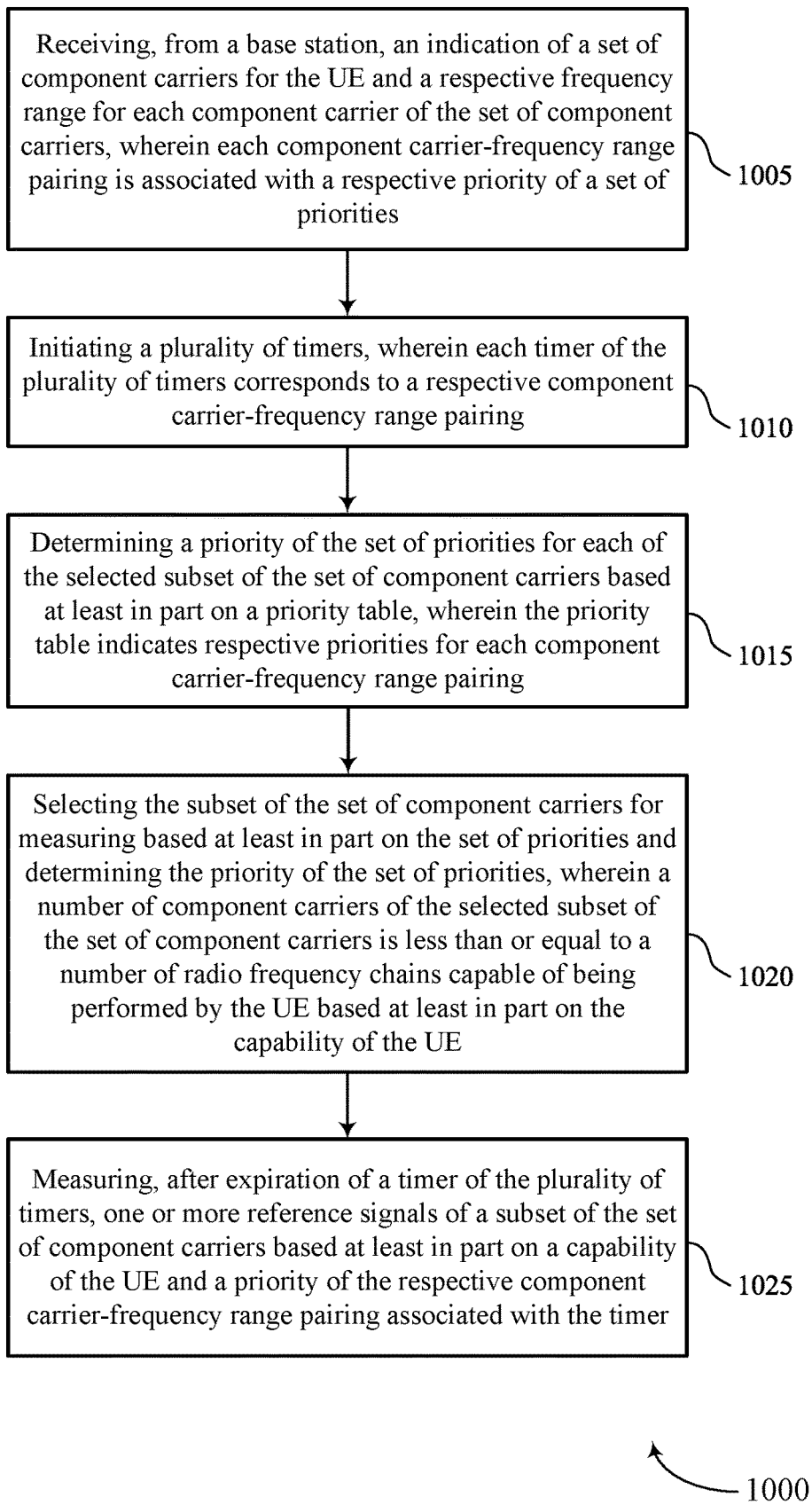

FIG. 10 shows a flowchart illustrating a method 1000 that supports techniques for parallel SAM in wireless communications in accordance with various aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, an indication of a set of CCs for the UE and a respective FR for each CC of the set of CCs, where each CC-FR pairing is associated with a respective priority of a set of priorities. The operations of 1005 may be performed in accordance with examples as disclosed herein. In some examples, aspects of the operations of 1005 may be performed by an indication receiver 725 as described with reference to FIG. 7.

At 1010, the method may include initiating a set of multiple timers, where each timer of the set of multiple timers corresponds to a respective CC-FR pairing. The operations of 1010 may be performed in accordance with examples as disclosed herein. In some examples, aspects of the operations of 1010 may be performed by a timer initiation component 730 as described with reference to FIG. 7.

At 1015, the method may include determining a priority of the set of priorities for each of the selected subset of the set of CCs based on a priority table, where the priority table indicates respective priorities for each CC-FR pairing. The operations of 1015 may be performed in accordance with examples as disclosed herein. In some examples, aspects of the operations of 1015 may be performed by a priority determination component 765 as described with reference to FIG. 7.

At 1020, the method may include selecting the subset of the set of CCs for measuring based on the set of priorities and determining the priority of the subset of priorities, where a number of CCs of the selected subset of the set of CCs is less than or equal to a number of radio frequency chains capable of being performed by the UE based on the capability of the UE. The operations of 1020 may be performed in accordance with examples as disclosed herein. In some examples, aspects of the operations of 1020 may be performed by a CC selection component 740 as described with reference to FIG. 7.

At 1025, the method may include measuring, after expiration of a timer of the set of multiple timers, one or more reference signals of a subset of the set of CCs based on a capability of the UE and a priority of the respective CC-FR pairing associated with the timer. The operations of 1025 may be performed in accordance with examples as disclosed herein. In some examples, aspects of the operations of 1025 may be performed by a reference signal measurement component 735 as described with reference to FIG. 7.

Figure 11:
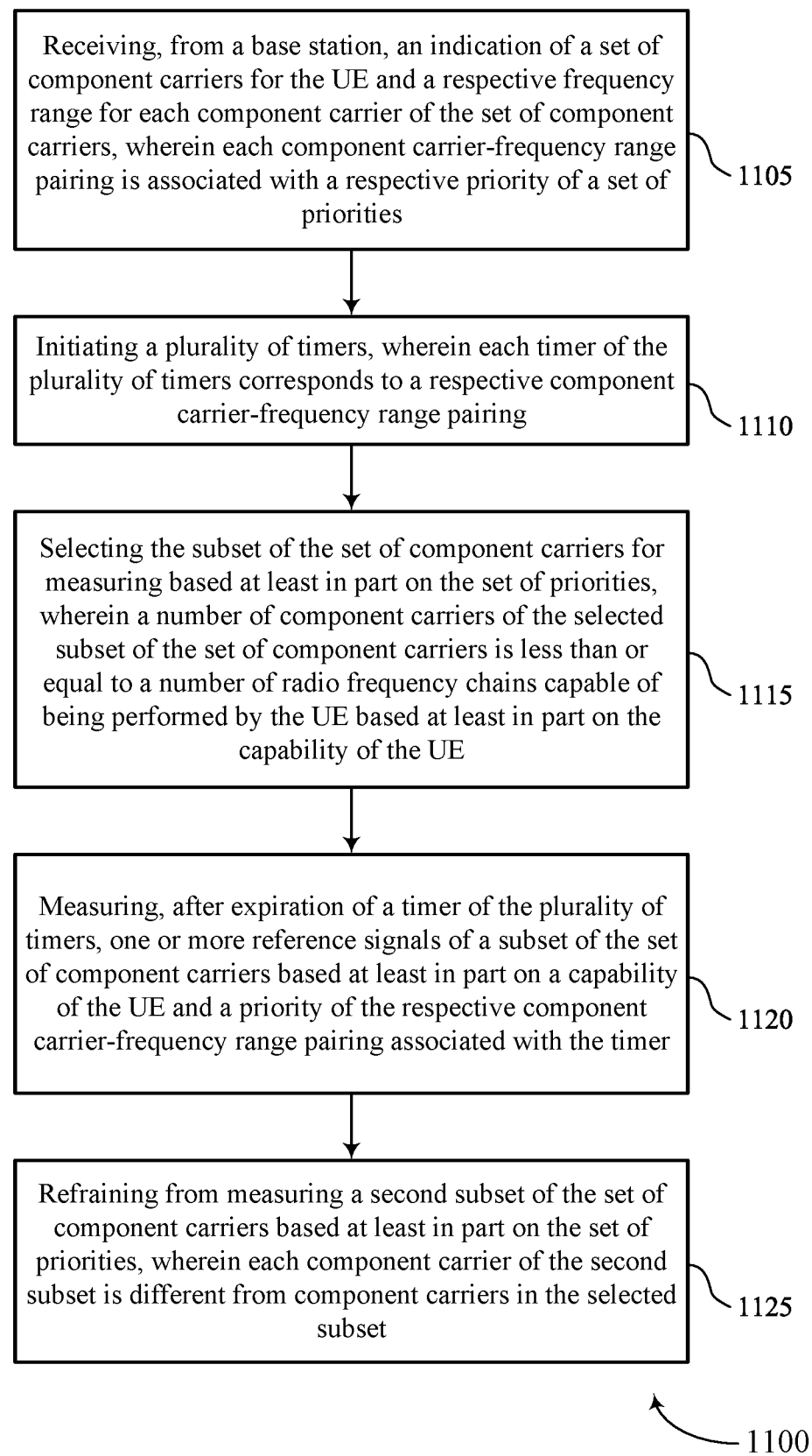

FIG. 11 shows a flowchart illustrating a method 1100 that supports techniques for parallel SAM in wireless communications in accordance with various aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, an indication of a set of CCs for the UE and a respective FR for each CC of the set of CCs, where each CC-FR pairing is associated with a respective priority of a set of priorities. The operations of 1105 may be performed in accordance with examples as disclosed herein. In some examples, aspects of the operations of 1105 may be performed by an indication receiver 725 as described with reference to FIG. 7.

At 1110, the method may include initiating a set of multiple timers, where each timer of the set of multiple timers corresponds to a respective CC-FR pairing. The operations of 1110 may be performed in accordance with examples as disclosed herein. In some examples, aspects of the operations of 1110 may be performed by a timer initiation component 730 as described with reference to FIG. 7.

At 1115, the method may include selecting the subset of the set of CCs for measuring based on the set of priorities, where a number of CCs of the selected subset of the set of CCs is less than or equal to a number of radio frequency chains capable of being performed by the UE based on the capability of the UE. The operations of 1115 may be performed in accordance with examples as disclosed herein. In some examples, aspects of the operations of 1115 may be performed by a CC selection component 740 as described with reference to FIG. 7.

At 1120, the method may include measuring, after expiration of a timer of the set of multiple timers, one or more reference signals of a subset of the set of CCs based on a capability of the UE and a priority of the respective CC-FR pairing associated with the timer. The operations of 1120 may be performed in accordance with examples as disclosed herein. In some examples, aspects of the operations of 1120 may be performed by a reference signal measurement component 735 as described with reference to FIG. 7.

At 1125, the method may include refraining from measuring a second subset of the set of CCs based on the set of priorities, where each CC of the second subset is different from CCs in the selected subset. The operations of 1125 may be performed in accordance with examples as disclosed herein. In some examples, aspects of the operations of 1125 may be performed by a reference signal measurement component 735 as described with reference to FIG. 7.

Figure 12:
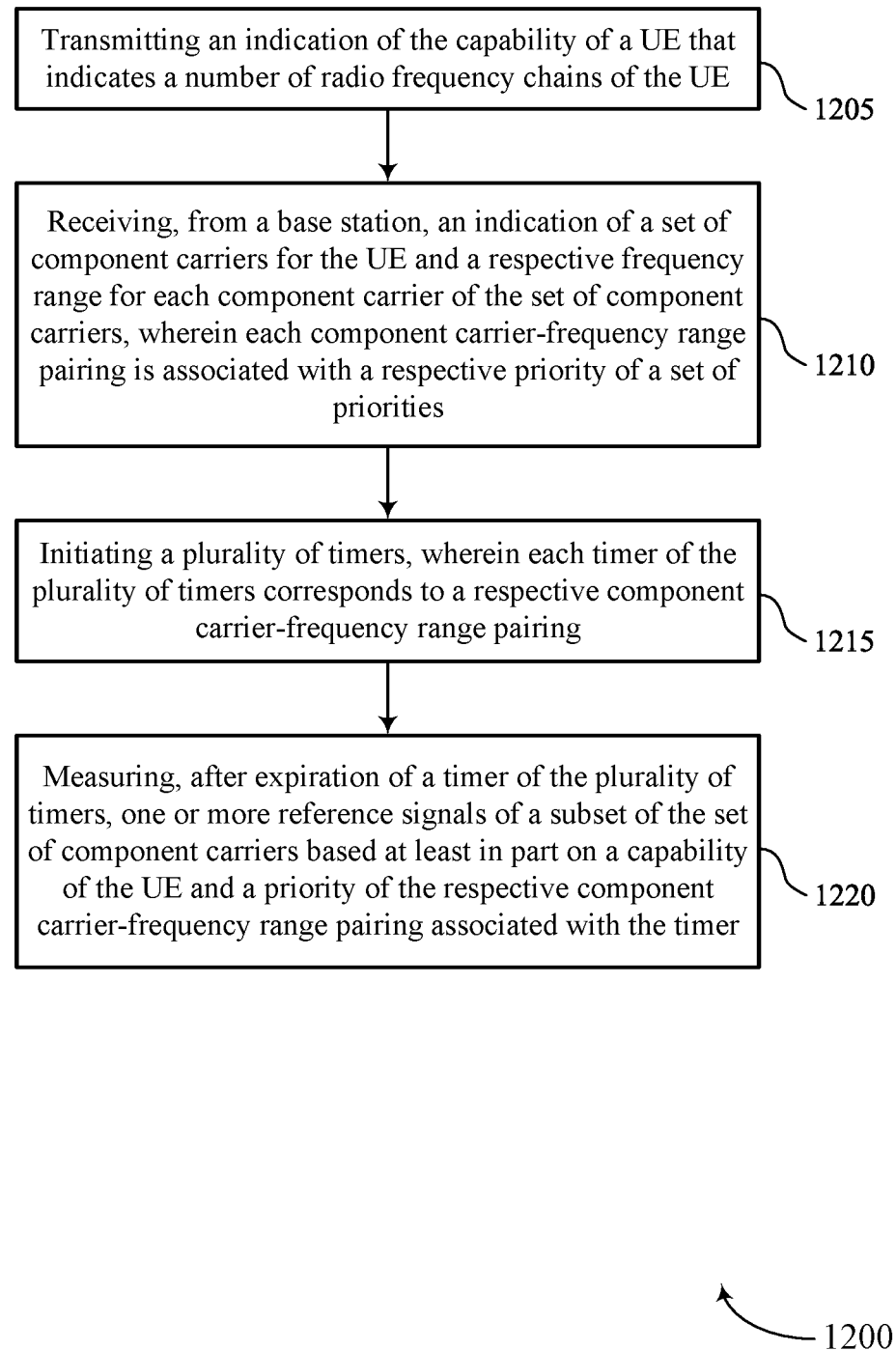

FIG. 12 shows a flowchart illustrating a method 1200 that supports techniques for parallel SAM in wireless communications in accordance with various aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include transmitting an indication of the capability of a UE that indicates a number of radio frequency chains of the UE. The operations of 1205 may be performed in accordance with examples as disclosed herein. In some examples, aspects of the operations of 1205 may be performed by a capability transmitter 750 as described with reference to FIG. 7.

At 1210, the method may include receiving, from a base station, an indication of a set of CCs for the UE and a respective FR for each CC of the set of CCs, where each CC-FR pairing is associated with a respective priority of a set of priorities. The operations of 1210 may be performed in accordance with examples as disclosed herein. In some examples, aspects of the operations of 1210 may be performed by an indication receiver 725 as described with reference to FIG. 7.

At 1215, the method may include initiating a set of multiple timers, where each timer of the set of multiple timers corresponds to a respective CC-FR pairing. The operations of 1215 may be performed in accordance with examples as disclosed herein. In some examples, aspects of the operations of 1215 may be performed by a timer initiation component 730 as described with reference to FIG. 7.

At 1220, the method may include measuring, after expiration of a timer of the set of multiple timers, one or more reference signals of a subset of the set of CCs based on a capability of the UE and a priority of the respective CC-FR pairing associated with the timer. The operations of 1220 may be performed in accordance with examples as disclosed herein. In some examples, aspects of the operations of 1220 may be performed by a reference signal measurement component 735 as described with reference to FIG. 7.

Figure 13:
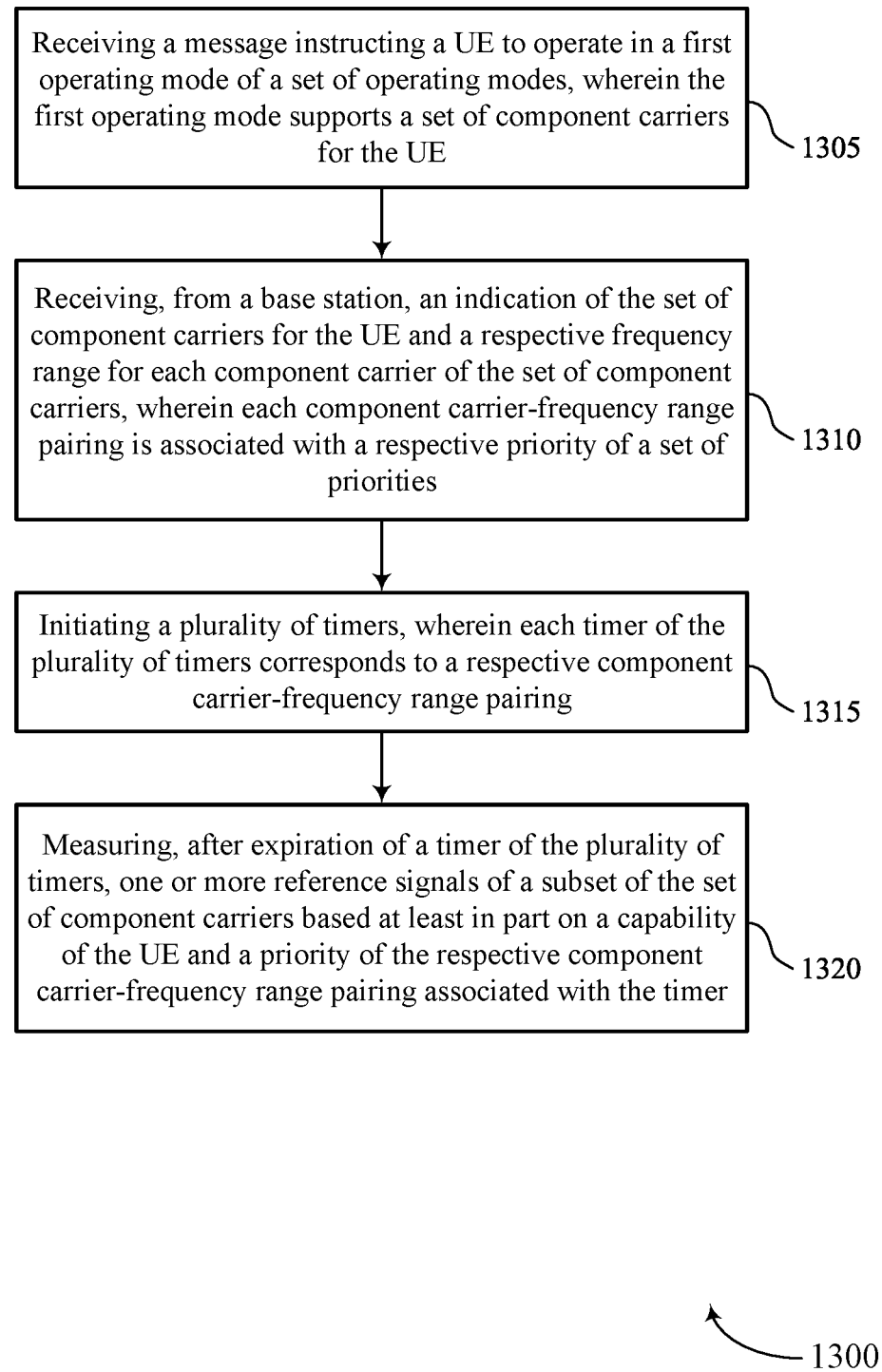

FIG. 13 shows a flowchart illustrating a method 1300 that supports techniques for parallel SAM in wireless communications in accordance with various aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving a message instructing a UE to operate in a first operating mode of a set of operating modes, where the first operating mode supports a set of CCs for the UE. The operations of 1305 may be performed in accordance with examples as disclosed herein. In some examples, aspects of the operations of 1305 may be performed by an operating mode indication receiver 755 as described with reference to FIG. 7.

At 1310, the method may include receiving, from a base station, an indication of the set of CCs for the UE and a respective FR for each CC of the set of CCs, where each CC-FR pairing is associated with a respective priority of a set of priorities. The operations of 1310 may be performed in accordance with examples as disclosed herein. In some examples, aspects of the operations of 1310 may be performed by an indication receiver 725 as described with reference to FIG. 7.

At 1315, the method may include initiating a set of multiple timers, where each timer of the set of multiple timers corresponds to a respective CC-FR pairing. The operations of 1315 may be performed in accordance with examples as disclosed herein. In some examples, aspects of the operations of 1315 may be performed by a timer initiation component 730 as described with reference to FIG. 7.

At 1320, the method may include measuring, after expiration of a timer of the set of multiple timers, one or more reference signals of a subset of the set of CCs based on a capability of the UE and a priority of the respective CC-FR pairing associated with the timer. The operations of 1320 may be performed in accordance with examples as disclosed herein. In some examples, aspects of the operations of 1320 may be performed by a reference signal measurement component 735 as described with reference to FIG. 7.

The following provides an overview of aspects of the present disclosure:

Aspect 1: A method for wireless communications at a UE, comprising: receiving, from a base station, an indication of a set of CCs for the UE and a respective FR for each CC of the set of CCs, wherein each CC-FR pairing is associated with a respective priority of a set of priorities; initiating a plurality of timers, wherein each timer of the plurality of timers corresponds to a CC-FR pairing; and measuring, after expiration of a timer of the plurality of timers, one or more reference signals of a subset of the set of CCs based at least in part on a capability of the UE and a priority of the respective CC-FR pairing associated with the timer.

Aspect 2: The method of aspect 1, further comprising: selecting the subset of the set of CCs for measuring based at least in part on the set of priorities, wherein a number of CCs of the selected subset of the set of CCs is less than or equal to a number of radio frequency chains capable of being performed by the UE based at least in part on the capability of the UE.

Aspect 3: The method of aspect 2, further comprising: determining a priority of the set of priorities for each of the selected subset of the set of CCs based at least in part on a priority table, wherein the priority table indicates respective priorities for each CC-FR pairing, and wherein the selected subset of the set of CCs is selected based at least in part on the determining.

Aspect 4: The method of any of aspects 2 through 3, further comprising: refraining from measuring a second subset of the set of CCs based at least in part on the set of priorities, wherein each CC of the second subset is different from CCs in the selected subset.

Aspect 5: The method of aspect 4, wherein refraining from measuring the second subset of the set of CCs comprises: refraining from measuring the second subset of the set of CCs based at least in part on each CC of the second subset having active timers or having a respective priority below a priority threshold.

Aspect 6: The method of aspect 5, wherein the priority threshold corresponds to the number of radio frequency chains of the UE based at least in part on the capability of the UE.

Aspect 7: The method of any of aspects 1 through 6, wherein the plurality of timers includes a respective timer for each CC-FR pairing.

Aspect 8: The method of any of aspects 1 through 7, further comprising: determining a measurement timing for each CC-FR pairing, wherein each timer of the plurality of timers corresponds to a respective measurement timing.

Aspect 9: The method of aspect 8, wherein each CC-FR pairing is associated with a first measurement timing corresponding to a connected DRX mode of the UE and a second measurement timing corresponding to an idle or inactive DRX mode of the UE.

Aspect 10: The method of any of aspects 1 through 9, wherein measuring the one or more reference signals comprises: measuring the one or more reference signals for each receive beam of a set of receive beams of the UE.

Aspect 11: The method of aspect 10, wherein measuring the one or more reference signals comprises: measuring the one or more reference signals over a set of resources allocated for the reference signals, the set of resources allocated based at least in part on one or more FRs associated with the one or more reference signals.

Aspect 12: The method of any of aspects 1 through 11, further comprising: transmitting an indication of the capability of the UE that indicates a number of radio frequency chains of the UE.

Aspect 13: The method of any of aspects 1 through 12, further comprising: receiving a message instructing the UE to operate in a first operating mode of a set of operating modes, wherein the first operating mode supports the set of CCs for the UE.

Aspect 14: The method of any of aspects 1 through 13, further comprising: determining a duration for each timer of the plurality of timers based at least in part on a UE mode, wherein the UE mode includes one of a normal mode or a panic mode.

Aspect 15: The method of any of aspects 1 through 14, wherein the one or more reference signals of the subset of the set of CCs are measured as a part of a SAM process for the UE.

Aspect 16: The method of any of aspects 1 through 15, wherein one or more CCs of the set of CCs includes an NB CC.

Aspect 17: An apparatus for wireless communications at a UE, comprising a processor; memory coupled with the processor; and instructions stored in the memory and executable by the processor to cause the apparatus to perform a method of any of aspects 1 through 16.

Aspect 18: An apparatus for wireless communications at a UE, comprising at least one means for performing a method of any of aspects 1 through 16.

Aspect 19: A non-transitory computer-readable medium storing code for wireless communications at a UE, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, an indication of a set of component carriers for the UE and a respective frequency range for each component carrier of the set of component carriers, wherein each component carrier-frequency range pairing is associated with a respective priority of a set of priorities;
   initiating a plurality of timers, wherein each timer of the plurality of timers corresponds to a respective component carrier-frequency range pairing; and
   measuring, after expiration of a timer of the plurality of timers, one or more reference signals of a subset of the set of component carriers based at least in part on a capability of the UE and a priority of the respective component carrier-frequency range pairing associated with the timer.

2. The method of claim 1, further comprising:
   selecting the subset of the set of component carriers for measuring based at least in part on the set of priorities, wherein a number of component carriers of the selected subset of the set of component carriers is less than or equal to a number of radio frequency chains capable of being performed by the UE based at least in part on the capability of the UE.

3. The method of claim 2, further comprising:
   determining a priority of the set of priorities for each of the selected subset of the set of component carriers based at least in part on a priority table, wherein the priority table indicates respective priorities for each component carrier-frequency range pairing, and wherein the selected subset of the set of component carriers is selected based at least in part on the determining.

4. The method of claim 2, further comprising:
   refraining from measuring a second subset of the set of component carriers based at least in part on the set of priorities, wherein each component carrier of the second subset is different from component carriers in the selected subset.

5. The method of claim 4, wherein refraining from measuring the second subset of the set of component carriers comprises:
   refraining from measuring the second subset of the set of component carriers based at least in part on each component carrier of the second subset having active timers or having a respective priority below a priority threshold.

6. The method of claim 5, wherein the priority threshold corresponds to the number of radio frequency chains of the UE based at least in part on the capability of the UE.

7. The method of claim 1, wherein the plurality of timers includes a respective timer for each component carrier-frequency range pairing.

8. The method of claim 1, further comprising:
   determining a measurement timing for each component carrier-frequency range pairing, wherein each timer of the plurality of timers corresponds to a respective measurement timing.

9. The method of claim 8, wherein each component carrier-frequency range pairing is associated with a first measurement timing corresponding to a connected discontinuous reception mode of the UE and a second measurement timing corresponding to an idle or inactive discontinuous reception mode of the UE.

10. The method of claim 1, wherein measuring the one or more reference signals comprises:
    measuring the one or more reference signals for each receive beam of a set of receive beams of the UE.

11. The method of claim 10, wherein measuring the one or more reference signals comprises:
    measuring the one or more reference signals over a set of resources allocated for the reference signals, the set of resources allocated based at least in part on one or more frequency ranges associated with the one or more reference signals.

12. The method of claim 1, further comprising:
    transmitting an indication of the capability of the UE that indicates a number of radio frequency chains of the UE.

13. The method of claim 1, further comprising:
    receiving a message instructing the UE to operate in a first operating mode of a set of operating modes, wherein the first operating mode supports the set of component carriers for the UE.

14. The method of claim 1, further comprising:
    determining a duration for each timer of the plurality of timers based at least in part on a UE mode, wherein the UE mode includes one of a normal mode or a panic mode.

15. The method of claim 1, wherein the one or more reference signals of the subset of the set of component carriers are measured as a part of a search and measurement process for the UE.

16. The method of claim 1, wherein one or more component carriers of the set of component carriers includes a narrowband component carrier.

17. An apparatus for wireless communications at a user equipment (UE), comprising:
    a processor;
    memory coupled with the processor; and
    instructions stored in the memory and executable by the processor to cause the apparatus to:
      receive, from a base station, an indication of a set of component carriers for the UE and a respective frequency range for each component carrier of the set of component carriers, wherein each component carrier-frequency range pairing is associated with a respective priority of a set of priorities;
      initiate a plurality of timers, wherein each timer of the plurality of timers corresponds to a respective component carrier-frequency range pairing; and measure, after expiration of a timer of the plurality of timers, one or more reference signals of a subset of the set of component carriers based at least in part on a capability of the UE and a priority of the respective component carrier-frequency range pairing associated with the timer.

18. The apparatus of claim 17, wherein the instructions are further executable by the processor to cause the apparatus to:
select the subset of the set of component carriers for measuring based at least in part on the set of priorities, wherein a number of component carriers of the selected subset of the set of component carriers is less than or equal to a number of radio frequency chains capable of being performed by the UE based at least in part on the capability of the UE.

19. The apparatus of claim 18, wherein the instructions are further executable by the processor to cause the apparatus to:
determine a priority of the set of priorities for each of the selected subset of the set of component carriers based at least in part on a priority table, wherein the priority table indicates respective priorities for each component carrier-frequency range pairing, and wherein the selected subset of the set of component carriers is selected based at least in part on the determining.

20. The apparatus of claim 18, wherein the instructions are further executable by the processor to cause the apparatus to:
refrain from measuring a second subset of the set of component carriers based at least in part on the set of priorities, wherein each component carrier of the second subset is different from component carriers in the selected subset.

21. The apparatus of claim 20, wherein the instructions to refrain from measuring the second subset of the set of component carriers are executable by the processor to cause the apparatus to:
refrain from measuring the second subset of the set of component carriers based at least in part on each component carrier of the second subset having active timers or having a respective priority below a priority threshold.

22. The apparatus of claim 21, wherein the priority threshold corresponds to the number of radio frequency chains of the UE based at least in part on the capability of the UE.

23. The apparatus of claim 17, wherein the plurality of timers includes a respective timer for each component carrier-frequency range pairing.

24. The apparatus of claim 17, wherein the instructions are further executable by the processor to cause the apparatus to:
determine a measurement timing for each component carrier-frequency range pairing, wherein each timer of the plurality of timers corresponds to a respective measurement timing.

25. The apparatus of claim 24, wherein each component carrier-frequency range pairing is associated with a first measurement timing corresponding to a connected discontinuous reception mode of the UE and a second measurement timing corresponding to an idle or inactive discontinuous reception mode of the UE.

26. The apparatus of claim 17, wherein the instructions to measure the one or more reference signals are executable by the processor to cause the apparatus to:
measure the one or more reference signals for each receive beam of a set of receive beams of the UE.

27. The apparatus of claim 26, wherein the instructions to measure the one or more reference signals are executable by the processor to cause the apparatus to:
measure the one or more reference signals over a set of resources allocated for the reference signals, the set of resources allocated based at least in part on one or more frequency ranges associated with the one or more reference signals.

28. The apparatus of claim 17, wherein the instructions are further executable by the processor to cause the apparatus to:
transmit an indication of the capability of the UE that indicates a number of radio frequency chains of the UE.

29. An apparatus for wireless communications at a user equipment (UE), comprising:
means for receiving, from a base station, an indication of a set of component carriers for the UE and a respective frequency range for each component carrier of the set of component carriers, wherein each component carrier-frequency range pairing is associated with a respective priority of a set of priorities;
means for initiating a plurality of timers, wherein each timer of the plurality of timers corresponds to a respective component carrier-frequency range pairing; and
means for measuring, after expiration of a timer of the plurality of timers, one or more reference signals of a subset of the set of component carriers based at least in part on a capability of the UE and a priority of the respective component carrier-frequency range pairing associated with the timer.

30. A non-transitory computer-readable medium storing code for wireless communications at a user equipment (UE), the code comprising instructions executable by a processor to:
receive, from a base station, an indication of a set of component carriers for the UE and a respective frequency range for each component carrier of the set of component carriers, wherein each component carrier-frequency range pairing is associated with a respective priority of a set of priorities;
initiate a plurality of timers, wherein each timer of the plurality of timers corresponds to a respective component carrier-frequency range pairing; and
measure, after expiration of a timer of the plurality of timers, one or more reference signals of a subset of the set of component carriers based at least in part on a capability of the UE and a priority of the respective component carrier-frequency range pairing associated with the timer.

* * * * *